United States Patent
Tomasko et al.

(10) Patent No.: US 11,073,218 B2
(45) Date of Patent: Jul. 27, 2021

(54) IN-LINE PRESSURE RELIEF VALVE AND RUPTURE DISK

(71) Applicants: John Tomasko, Limerick (IE); Sarah Fiegener, Tulsa, OK (US); Tiago Martins De Freitas, SAO Sao Paulo Sp (BR); Geoffrey Brazier, Woodbury, MN (US)

(72) Inventors: John Tomasko, Limerick (IE); Sarah Fiegener, Tulsa, OK (US); Tiago Martins De Freitas, SAO Sao Paulo Sp (BR); Geoffrey Brazier, Woodbury, MN (US)

(73) Assignee: BS&B Innovations Limited, Limerick (IE)

( * ) Notice: Subject to any disclaimer, the term of this patent is extended or adjusted under 35 U.S.C. 154(b) by 0 days.

(21) Appl. No.: 15/327,211

(22) PCT Filed: Jul. 22, 2015

(86) PCT No.: PCT/US2015/041567
§ 371 (c)(1),
(2) Date: Jan. 18, 2017

(87) PCT Pub. No.: WO2016/014683
PCT Pub. Date: Jan. 28, 2016

(65) Prior Publication Data
US 2017/0175910 A1    Jun. 22, 2017

Related U.S. Application Data

(60) Provisional application No. 61/999,280, filed on Jul. 23, 2014.

(51) Int. Cl.
F16K 17/04    (2006.01)
F16K 17/16    (2006.01)
(Continued)

(52) U.S. Cl.
CPC ......... *F16K 17/048* (2013.01); *F16K 15/028* (2013.01); *F16K 17/16* (2013.01); *F25B 41/20* (2021.01); *F25B 2500/07* (2013.01)

(58) Field of Classification Search
CPC ....... F16K 17/048; F16K 17/16; F16K 15/026
(Continued)

(56) References Cited

U.S. PATENT DOCUMENTS 2,641,273 A    6/1953 Siebens
2,870,784 A *  1/1959 Walls ...................... E21B 21/10
                                                    137/515.7

(Continued)

FOREIGN PATENT DOCUMENTS

DE    20 2004 002 889    4/2004
DE    11 2011 104 551 T5    11/2013
(Continued)

OTHER PUBLICATIONS

International Search Report from the European Patent Office for International Application No. PCT/US2015/041567, dated Oct. 5, 2015.
(Continued)

*Primary Examiner* — P. Macade Nichols
(74) *Attorney, Agent, or Firm* — Finnegan, Henderson, Farabow, Garrett & Dunner, LLP

(57) ABSTRACT

A pressure relief device, comprising: a valve body (100) having a central bore, wherein a valve seat (130) is disposed within the central bore of the valve body (100); a plug (200); a spring (500) configured to press the plug (200) into sealing engagement with the valve seat (130); a bumper (300) extending from the plug (200), wherein the bumper (200) extends along a central axis of the spring (500); and a holder
(Continued)

(400) configured to lock into the valve body (100), wherein the holder (100) is configured to hold the spring (500) within the valve body (100).

12 Claims, 11 Drawing Sheets

(51) Int. Cl.
*F16K 15/02* (2006.01)
*F25B 41/20* (2021.01)

(58) Field of Classification Search
USPC .................................. 137/68.19–68.23, 543
See application file for complete search history.

(56) References Cited

U.S. PATENT DOCUMENTS

| | | | |
|---|---|---|---|
| 3,207,179 | A | 11/1962 | Klagues |
| 3,146,792 | A | 9/1964 | Donnelly |
| 3,339,883 | A | 9/1967 | Drake |
| 3,478,774 | A | 11/1969 | Noakes |
| 4,706,929 | A | 11/1987 | Kalaskie |
| 5,477,877 | A | 12/1995 | Schulze |
| 5,511,576 | A | 4/1996 | Borland |
| 5,632,297 | A | 5/1997 | Sciullo |
| 6,039,073 | A * | 3/2000 | Messick ................ F16K 15/063 137/515.7 |
| 6,206,032 | B1 | 5/2001 | Hill |
| 7,293,574 | B2 | 11/2007 | Schwartz |
| 7,309,113 | B2 | 12/2007 | Carter |
| 8,234,877 | B2 | 8/2012 | Beekman |
| 8,701,710 | B2 | 4/2014 | MacNeal |
| 9,383,183 | B2 | 7/2016 | Mayr |
| 2003/0217770 | A1 | 11/2003 | Schultz |
| 2006/0124170 | A1 | 6/2006 | Schaefer et al. |
| 2009/0241568 | A1 | 10/2009 | Voorhis |
| 2011/0079292 | A1* | 4/2011 | Nunez ................... B65D 90/34 137/68.19 |
| 2014/0109600 | A1 | 4/2014 | Lefevre |
| 2014/0216575 | A1 | 8/2014 | Ikeda |
| 2014/0331704 | A1 | 11/2014 | Kondrk |

FOREIGN PATENT DOCUMENTS

| | | |
|---|---|---|
| FR | 2 983 259 | 5/2013 |
| WO | WO/1996/01445 | 1/1996 |
| WO | WO 03/102314 | 12/2003 |
| WO | WO 2011/135125 | 11/2011 |
| WO | WO/2011/146192 | 11/2011 |
| WO | WO/2015/001465 | 1/2015 |

OTHER PUBLICATIONS

Written Opinion of the International Searching Authority from the European Patent Office for International Application No. PCT/US2015/041567, dated Oct. 5, 2015.
Examination Report from the European Patent Office, Application No. 15 745 701.1 (dated Jan. 30, 2018) (5 pages).
Examination Report from the European Patent Office, Application No. 15 745 701.1 (dated May 9, 2019) (4 pages).
Notice of Loss of Rights from the European Patent Office, Application No. 15 745 701.1 (dated Dec. 18, 2019) (2 pages).
Response Submitted in European Patent Office, Application No. 15 745 701.1 (dated Feb. 27, 2020) (15 pages).
Decision on Further Processing in European Patent Office, Application No. 15 745 701.1 (dated Mar. 18, 2020) (1 page).

* cited by examiner

IN-LINE PRESSURE RELIEF VALVE AND RUPTURE DISK

CROSS-REFERENCE TO RELATED APPLICATIONS

This application claims the benefit of U.S. Provisional Application No. 61/999,280, filed Jul. 23, 2014, by John Tomasko et al. and titled IN-LINE PRESSURE RELIEF VALVE AND RUPTURE DISK, the disclosure of which is expressly incorporated herein by reference.

FIELD OF THE DISCLOSURE

This disclosure generally relates to a pressure relief device for protection against overpressure situations. More specifically, this disclosure relates to an in-line pressure relief valve, which may be used in combination with a rupture disk, and which may be particularly suited for use in refrigeration applications with pressure relief set pressures above 15 psi.

BACKGROUND

Refrigeration and cooling systems rely on the use of chemical refrigerants to generate or maintain temperatures below (typically much below) those of the surrounding environment. Historically, such chemical refrigerants included ozone-depleting compounds, such as chlorofluorocarbons ("CFC"). As the ozone-depleting attributes of CFC compounds became better understood, the chemical industry began to develop alternative refrigerants that, while more expensive, are less harmful to the earth's ozone layer. One such CFC alternative, a hydrochlorofluorocarbon ("HCFC") often referred to as HCFC123 or R123, achieved widespread use throughout the 1990's and early 2000's. The R123 refrigerant is now being phased out in favor of compounds having even less environmental impact potential. The emerging replacement refrigerants (including, e.g., HFO-1233zd(e)) are typically even more expensive and are implemented at substantially higher operating pressures than their predecessors. And although environmental impact has been improved, measures still must be implemented to minimize the chances of refrigerants being released into the environment for at least economic and good practices reasons. Accordingly, there is a need for an improved pressure relief device capable of operation at the higher pressures demanded of emerging refrigerants, and which can minimize or eliminate the risk of unnecessarily releasing the refrigerant into the environment and incurring the environmental concern and financial costs accompanying such release. The present disclosure provides embodiments of such an improved pressure relief device.

SUMMARY

In one embodiment, the present disclosure describes a pressure relief device, comprising a valve body having a central bore, wherein a valve seat is disposed within the central bore of the valve body. A spring may be configured to press a plug into sealing engagement with the valve seat. A bumper may extend from the plug, wherein the bumper extends along a central axis of the spring. A holder may be configured to lock into the valve body, wherein the holder may be configured to hold the spring within the valve body.

According to another embodiment, a disclosed pressure relief device may comprise a valve body having an internal valve seat, a plug configured to sealingly engage with the valve seat, and a spring configured to maintain the plug in sealing engagement with the valve seat. The device may include means for retaining the spring within the valve body and means for keeping the spring in alignment during compression of the spring.

BRIEF DESCRIPTION OF THE DRAWINGS

The accompanying drawings, which are incorporated in and constitute a part of this specification, illustrate embodiments of the disclosure and, together with the description, serve to explain principles of the disclosure.

DESCRIPTION OF THE EMBODIMENTS

Reference will now be made in detail to the present exemplary embodiments, examples of which are illustrated in the accompanying figures.

Figure 1:
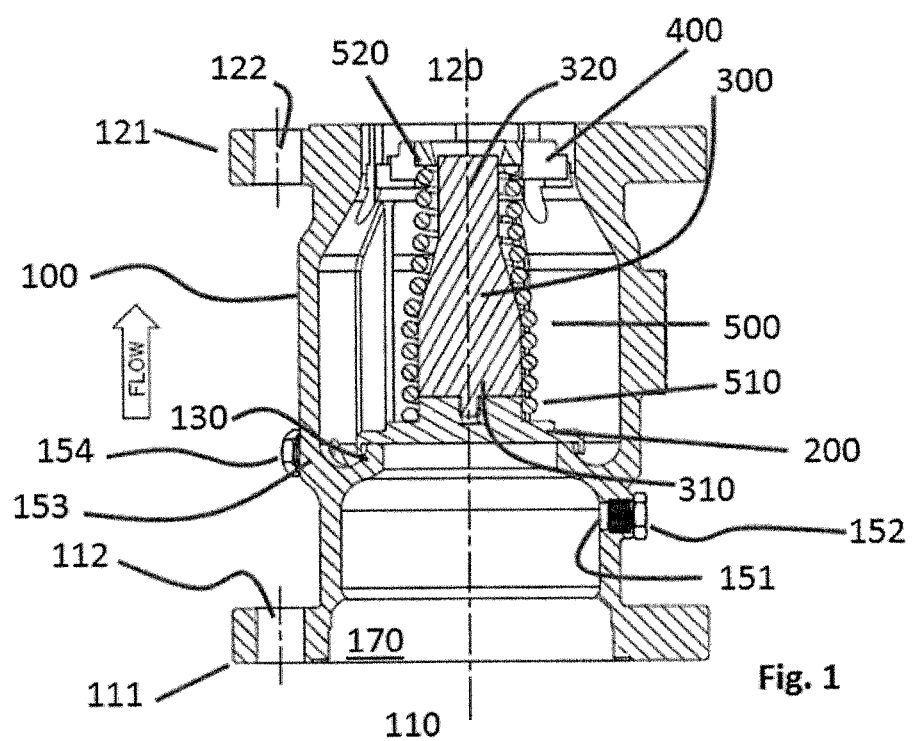
FIG. 1 is a cross-sectional illustration of a valve assembly according to the present disclosure.

FIG. 1 illustrates one embodiment of a valve assembly according to the present disclosure. As illustrated, a valve body 100 has a central bore defining an inlet 110 and an outlet 120. A valve seat 130 is provided within the valve body. The valve body 100 also is provided with an inlet flange 111 and an outlet flange 121, which may include bolt holes 112, 122, to allow the valve body to be installed with mated companion flanges of a fluid flow or containment system (not shown). In one embodiment, the valve body 100 may be installed between companion flanges in ASME 816.5 Class 150.

The valve body 100 is illustrated as having at least one connection port 151 positioned on the upstream/inlet side of the valve seat 130. The connection port 151 may be used to facilitate connection of devices such as an excess flow valve (not shown), a pressure gage (not shown), or a pressure sensor (not shown). As illustrated, the connection port 151 may take the form of a threaded bore, which may be capped with a mated threaded cap 152 when no device is connected. In one embodiment, the connection port 151 may be configured to satisfy an applicable code requirement (e.g., ASME, CEN, or ISO).

The valve body 100 also is illustrated as having at least one access port 153 on the downstream/outlet side of the valve seat 130. The access port 153 may be a normally-plugged access port 153 having a plug 154 inserted therein. In one embodiment, the access port 153 and plug 154 may be provided with mated threading. The access port 153 may be used to facilitate drainage and/or inspection of the downstream valve cavity of the valve body 100. For example, a user may service the valve by opening the access port 153 (by removing plug 154) to remove condensate without having to remove the valve from the system.

As illustrated in FIG. 1, a valve plug 200 is disposed within the valve body 100, and is configured to form a fluid-tight seal with the valve seat 130. The valve plug 200 and/or valve seat 130 may be provided with features to create a desired seal. For example, a material of the sealing surfaces of the valve seat 130 and/or valve plug 200 may be selected to optimize the seal. The material may be an elastomeric material, metal material, other material, or a combination of materials. In one embodiment, a seal may be created using one or more elastomeric members (such as an O-ring) provided in one or both of the valve plug 200 and valve seat 130.

Figure 2:
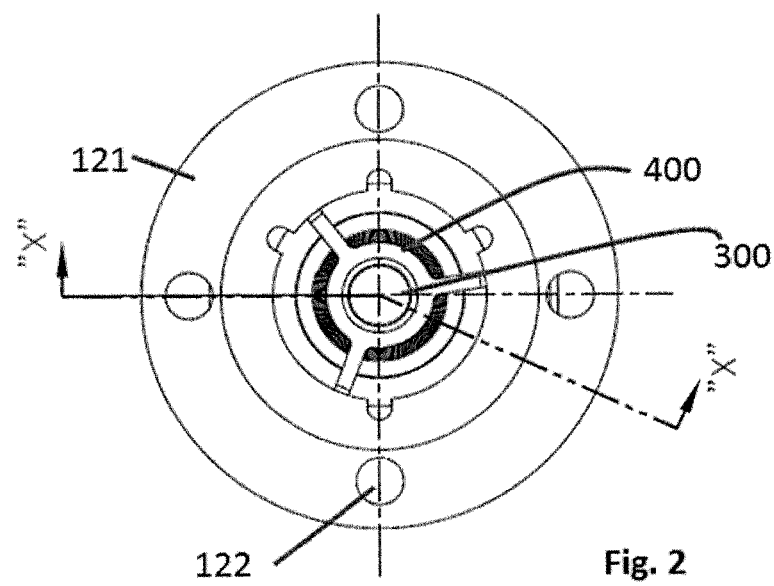
FIG. 2 is a top-down view of the valve assembly of FIG. 1.

The valve plug 200 is held in sealing engagement with the valve seat 130 by a coil spring 500, which is held in place by a holder 400 (best illustrated in FIG. 2). A bumper 300 extends upward from the valve plug 200, through the center of the coil spring 500, and through a holder ring 410 of the holder 400. In FIG. 1, the bumper 300 is illustrated as having a relatively tapered shape, with a holder-end 320 having a smaller diameter than a plug-end 310 of the bumper. The relatively tapered shape of the bumper 300 may allow for the use of a tapered spring (described below), and may reduce flow restrictions and/or improve fluid flow characteristics (such as turbulence) at the outlet of the valve.

As shown in FIG. 1, the coil spring 500 may be tapered (or relatively conical or "barrel"-shaped) such that the spring has a wider plug-end 510 and a narrower holder-end 520. This tapered-spring design may reduce flow restrictions at the outlet 120 of the valve, thereby increasing the rate of fluid flow and/or improving flow characteristics (such as turbulence).

In an alternate embodiment (not depicted in FIG. 1 the coil spring 500 may be positioned inside an elastic or plastic sleeve, such that process fluid does not contaminate the spring mechanism.

Figure 3:
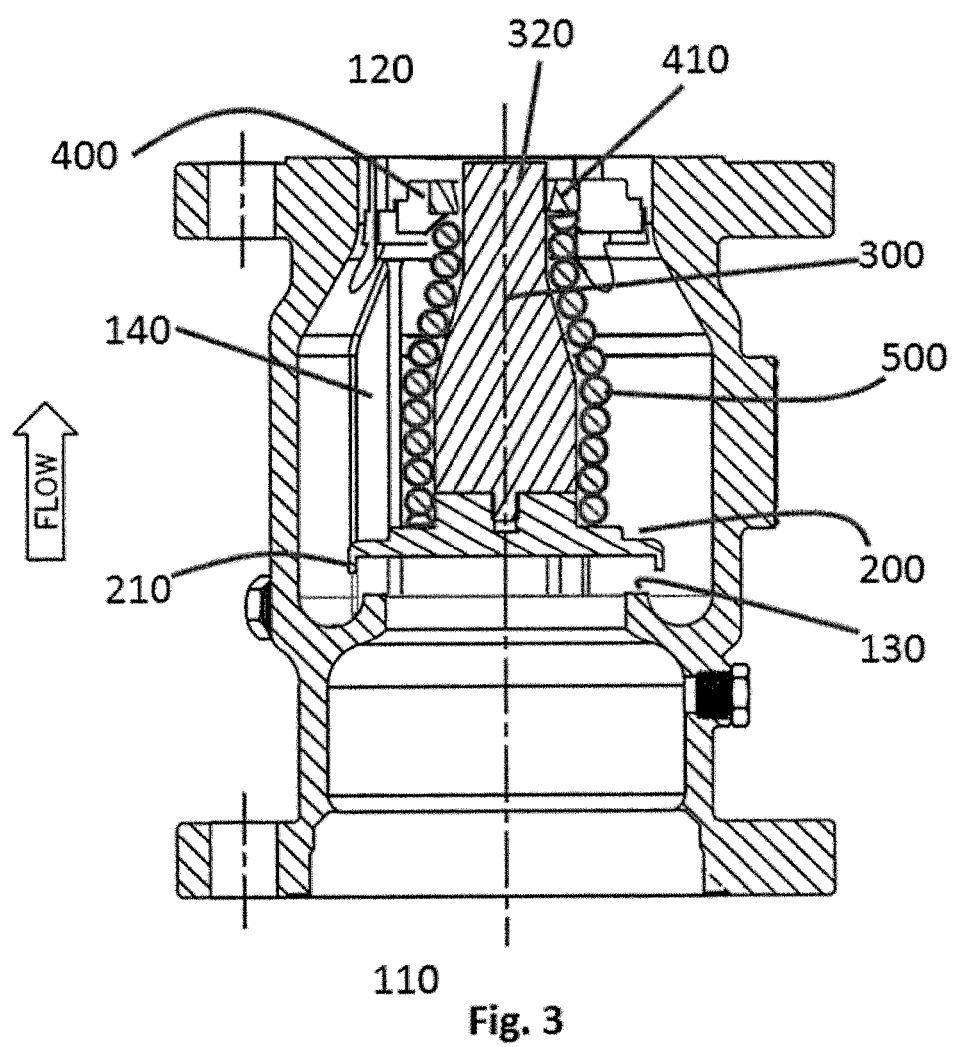
FIG. 3 is a cross-sectional illustration of the valve assembly of FIG. 1, shown in a valve-open configuration.

FIG. 3 illustrates the valve assembly of FIGS. 1-2 in a valve-open position. As illustrated, pressure at the inlet 110 of the valve forces the spring 500 to compress, which allows the valve plug 200 to come unseated from the valve seat 130 and allows fluid to flow from the valve inlet 110 to the valve outlet 120. As fluid flows between the plug 200 and seat 130, a certain lift is generated on the valve plug 200. According to the present disclosure, a desired lift may be facilitated by varying the depth (d) of a plug hood 210. It is also contemplated that a desired lift may be facilitated by varying other dimensions of the valve plug 200, including the cross-sectional profile of the plug hood 210 and/or of the plug 200 itself (e.g., the plug may be flat, convex, concave, or other shape). In one embodiment, the shape of the valve plug 200 and/or plug hood 210 may be selected based on the characteristics (e.g., viscosity) of the fluid. In addition to achieving a desired amount of lift, the plug hood 210 also may stabilize the flow around the valve plug 200.

The valve body 100 may be provided with internal vanes 140, which extend inwardly from the center bore of the valve body 100. The internal vanes 140 may direct fluid flow. The internal vanes 140 also may keep the plug 200 centered within the valve body 100 by limiting or preventing the lateral (non-axial) movement of the valve plug 200. The vanes 140 may thus ensure that fluid flows evenly around the plug 200 and may guide the plug 200 for proper re-seating once sufficient pressure has been relieved form the system.

As illustrated in FIG. 3, as the plug 200 and bumper 300 move upward off of the valve seat 130, the holder end of 320 the bumper 300 extends upward through the ring 410 of the holder 400, and the spring 500 compresses around the bumper 300. One or more features may ensure that the spring 500 compresses evenly. First, the tapered (or conical or "barrel"-shaped) profile of the spring 500 may facilitate even compression. Second, the bumper 300 may ensure that the spring 500 remains centered about its axis during compression, which likewise ensures that the spring 500 is evenly compressed. Evenly compressing the spring 500 creates a consistent opening between the valve plug 200 and valve seat 130—i.e., by keeping the valve plug 200 and valve seat 130 in a parallel orientation—thereby facilitating uniform flow around the valve plug 200 and/or increasing flow capacity. In contrast to the present disclosure, a known cylindrical spring without a bumper allowed the spring to come out of alignment due to off-axis bowing, and allowed the valve plug to open unevenly. The tendency of a known spring to bow off axis was exacerbated by escaping fluid, which would tend to push the spring off axis. The present disclosure solves those deficiencies in the prior art.

Figure 4:
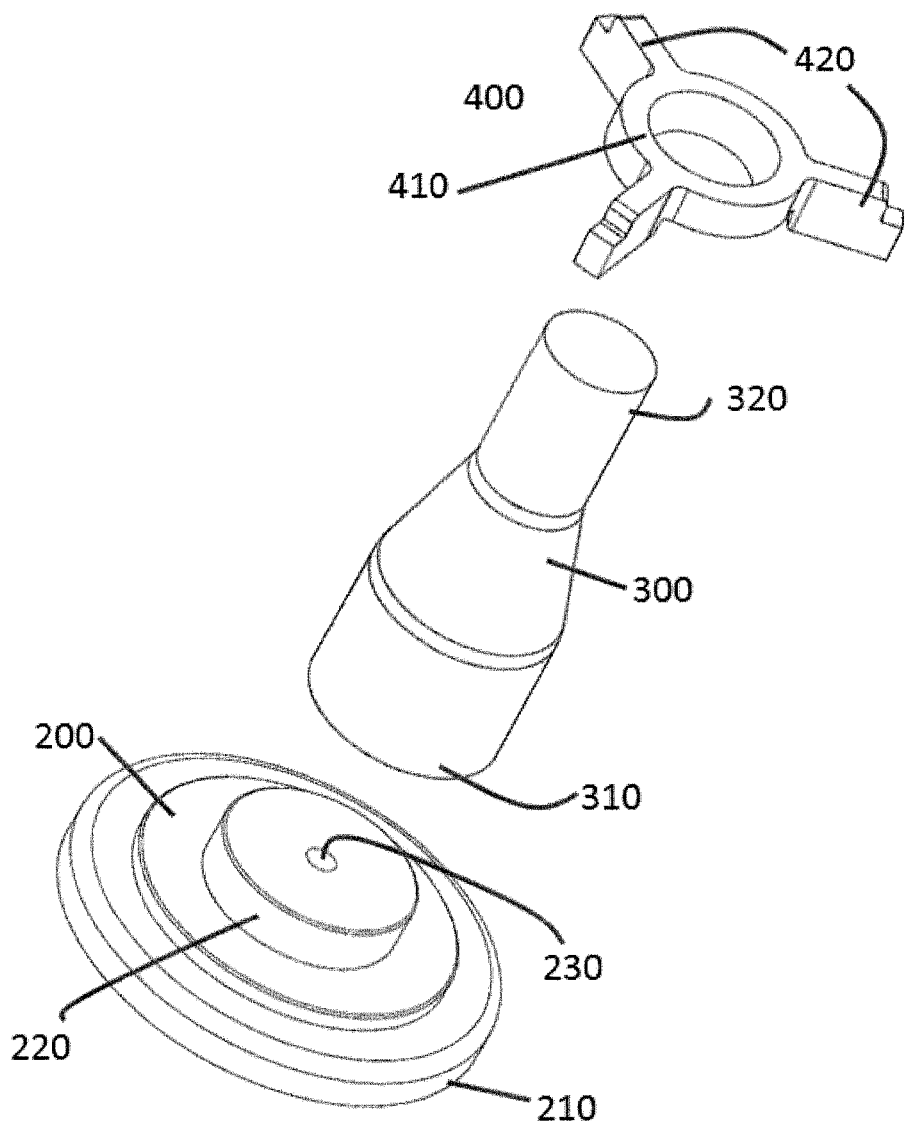
FIG. 4 is an exploded perspective view of a plug, bumper, and holder.

FIG. 4 is an exploded view of a valve plug 200, bumper 300, and holder 400 according to the present disclosure. As illustrated, the valve plug 200 includes a hood 210, a spring guide 220 (for insertion into a plug-end of a spring), and an interface 230 for connection with a bumper 300. The bumper 300 includes a plug end 310 and a holder end 320. The holder 400 includes locking arms 420 and a holder ring 410, through which the holder end 320 of the bumper 300 may slide. The holder ring 410 may keep the bumper 300 from moving laterally (i.e., in non-axial directions), thereby maintaining alignment of the bumper-plug-spring combination. As illustrated, the bumper 300 and plug 200 are separate components, which may allow for the use of interchangeable/replaceable plugs 200 depending on the particular application of the valve. The bumper 300 and plug 200 may be attached together through any suitable mechanism. In one embodiment, the bumper 300 and plug 200 may be screwed together through a set of matching threads. Alternatively, a bumper and plug may be glued, welded, or snap-fit together. In another embodiment, a bumper and plug may be integrally formed (i.e., an all-in-one design such as by metal casting.)

Figure 5B:
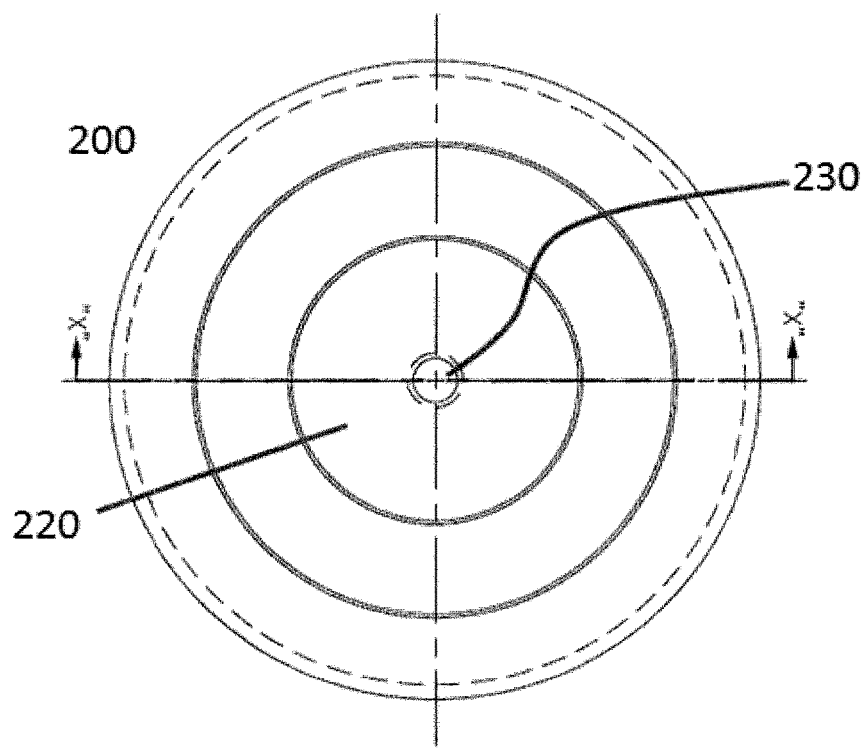
FIGS. 5A and 5B illustrate a cross-sectional and top-down view of a plug.
Figure 5A:
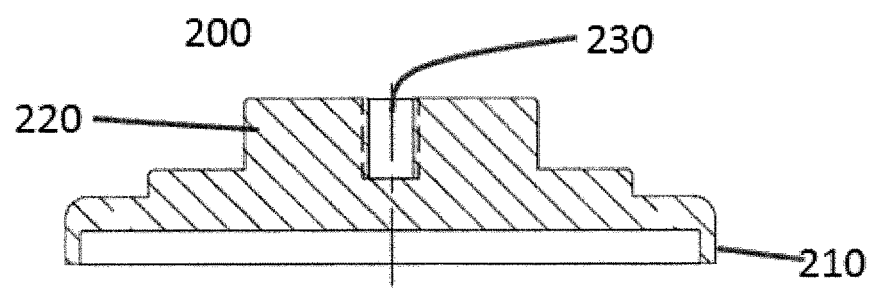

FIGS. 5A and 5B illustrate the plug 200 in more detail. As shown, the plug 200 may be provided with a bumper interface 230 (which may be, e.g., a threaded bore), a spring guide 220 (which may be inserted into a plug end of a spring), and a hood 210. As discussed above, the depth (d) of the hood 210 may be selected to facilitate a desired lift on the plug 200 caused by flowing fluid.

Figure 6B:
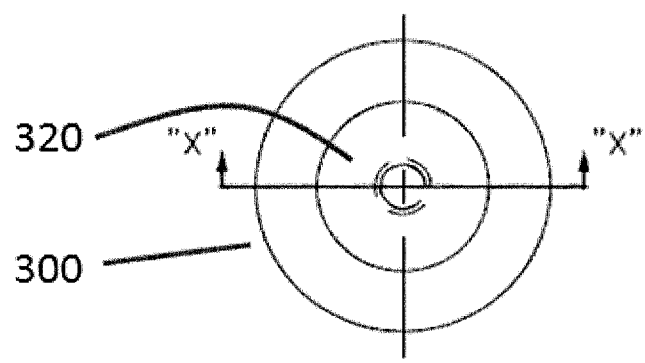
FIGS. 6A and 6B illustrate a cross-sectional and top-down view of a bumper.
Figure 6A:
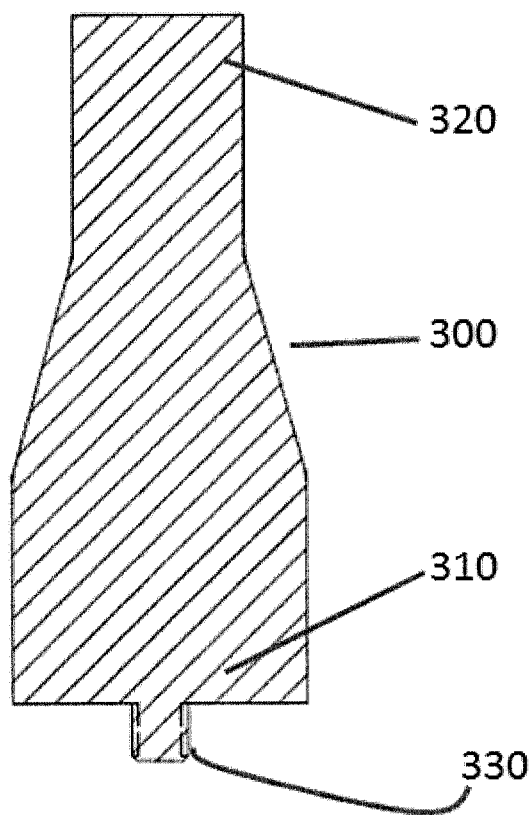

FIGS. 6A and 6B illustrate the bumper 300 in more detail. As shown, the bumper has a wider plug end 310 and a narrower holder end 320. At the plug end 310, the bumper 300 may be provided with a plug interface 330 (which may be, e.g., a threaded post).

Figure 7:
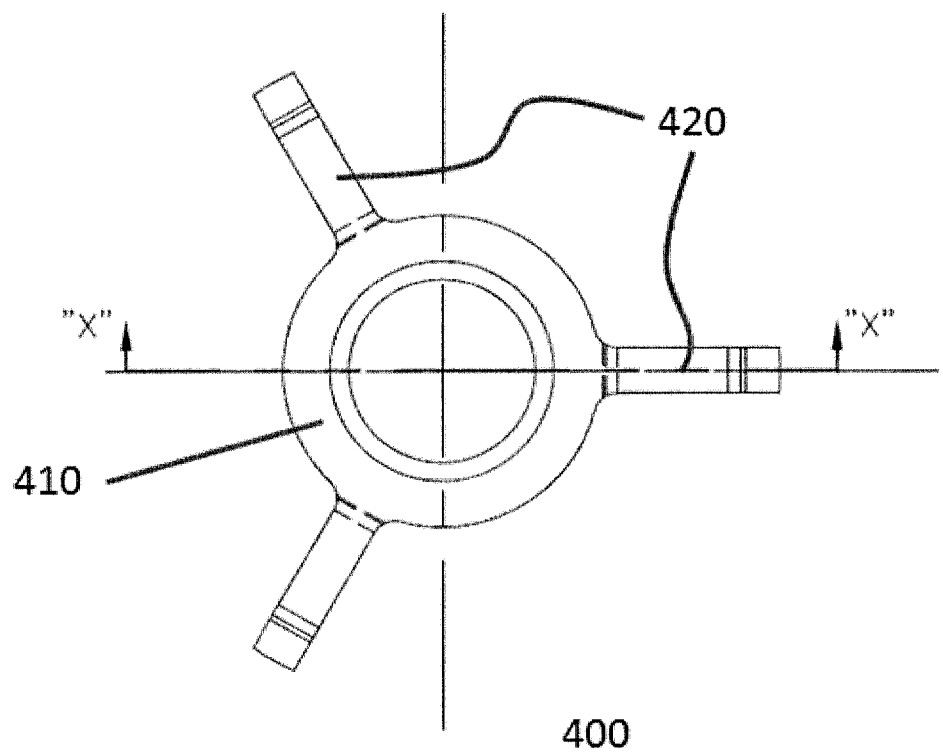
FIG. 7 illustrates a top-down view of a holder.

FIG. 7 illustrates the holder 400 in more detail. As shown, the holder 400 includes a ring 410 and three locking arms 420. In another embodiment, any suitable number of locking arms may be used (e.g., two, four, or more than four).

Figure 8:
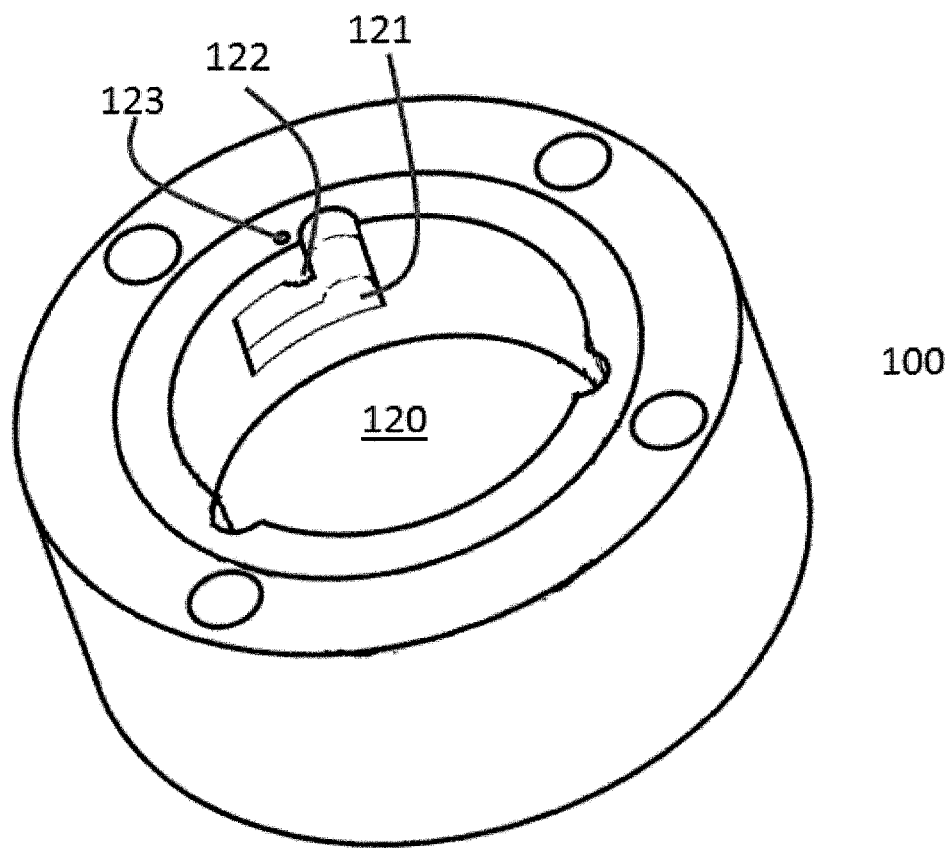
FIG. 8 illustrates the outlet of a valve body configured to cooperate with the holder of FIG. 7.
Figure 9:
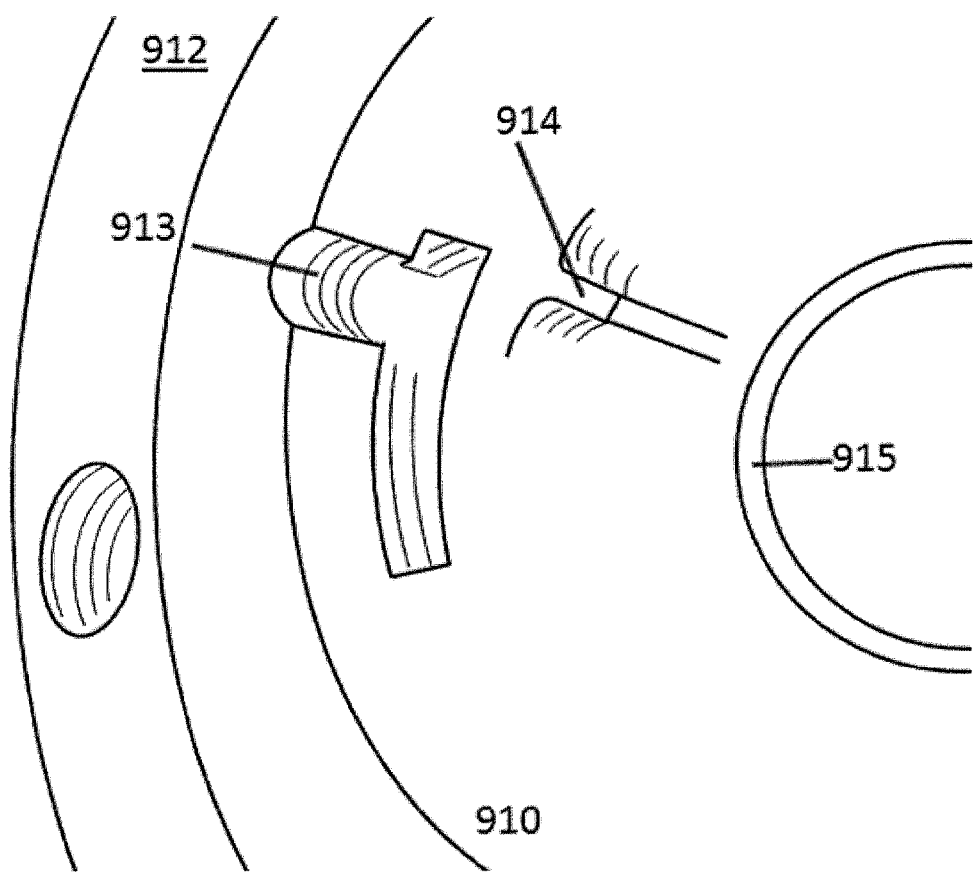
FIG. 9 is a partial perspective view of a valve body according to the present disclosure.

FIG. 8 illustrates the outlet 120 of a valve body 100, showing integral slots 121 into which the locking arms 420 of the holder 400 of FIG. 7 may be inserted and locked into place. As illustrated, the outlet 120 is provided with three integral slots 121 (corresponding to the three locking arms 420 of the holder 400 in FIG. 7). When the plug 200, bumper 300, and spring 500 are inserted into the valve body 100 (as illustrated, e.g., in FIG. 1), the locking arms 420 of the holder 400 (FIG. 7) are inserted into the slots 121 and rotated (counter-clockwise in FIG. 8) into a locked position. The holder 400 may thus hold the plug 200, bumper 300, and spring 500 into position (as illustrated, e.g., in FIG. 1). In one embodiment, the holder 400 may pre-load the spring 500 into a partially compressed condition. As illustrated in FIG. 9, one or more of the slots 121 may be provided with a tang 122 or other feature to prevent the locked holder from rotating out of the locked position. Additionally or alternatively, a mechanical locking device may be provided to prevent the locked holder 400 from rotating out of the locked position. As shown in FIG. 8, for example, a pin hole 123 may be provided for insertion of a locking pin (not shown) to hold the locked holder 400 into the locked position. Such features may prevent the valve assembly from becoming disassembled inadvertently or through tampering.

The use of a holder 400 allows for the use of higher-load springs than in the prior art (e.g., higher load springs than can be used with the "J"-hook spring retention devices used in prior art devices). Accordingly, the use of a holder 400 may allow a valve assembly to be used in high-pressure applications, such as with newly developed higher-pressure refrigerants.

FIG. 9 illustrates another embodiment of a valve body 910 according to the present disclosure. In FIG. 9, the valve outlet 912 is provided with integral slots 913 as discussed above in connection with FIG. 8. Also visible in FIG. 9 are examples of internal vanes 914 and a valve seat 915 similar to those discussed above in connection with FIGS. 2 and 3.

Figure 10:
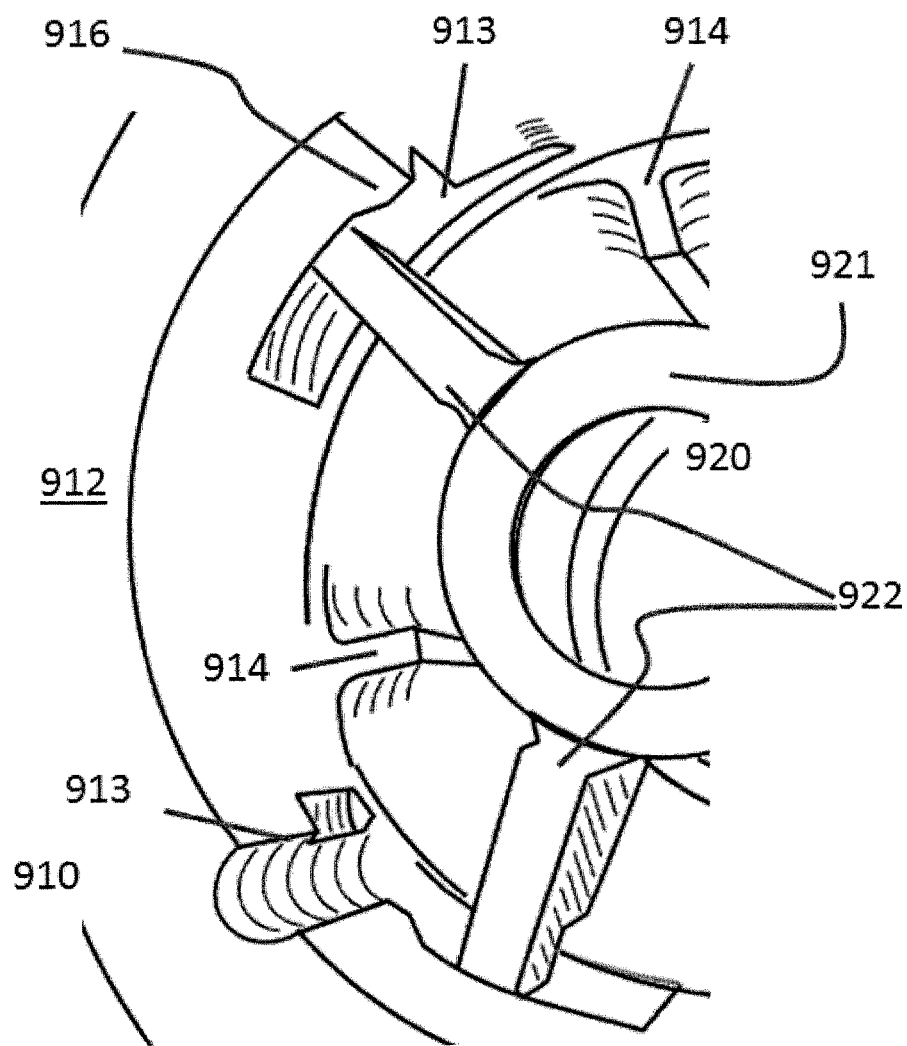
FIG. 10 is a partial perspective view of the valve body of FIG. 9 in combination with a holder.

FIG. 10 illustrates the valve body 910 of FIG. 9 in combination with a holder 920 having a holder ring 921 and locking arms 922. As illustrated, the holder locking arms 922 have been inserted into the slots 913 and rotated into a locked position. A tang 916 prevents the locking arms 922 from being rotated back into an unlocked position. For illustration purposes only, no valve plug, bumper, or spring is installed in the valve sub-assembly shown in FIG. 10.

Figure 11A:
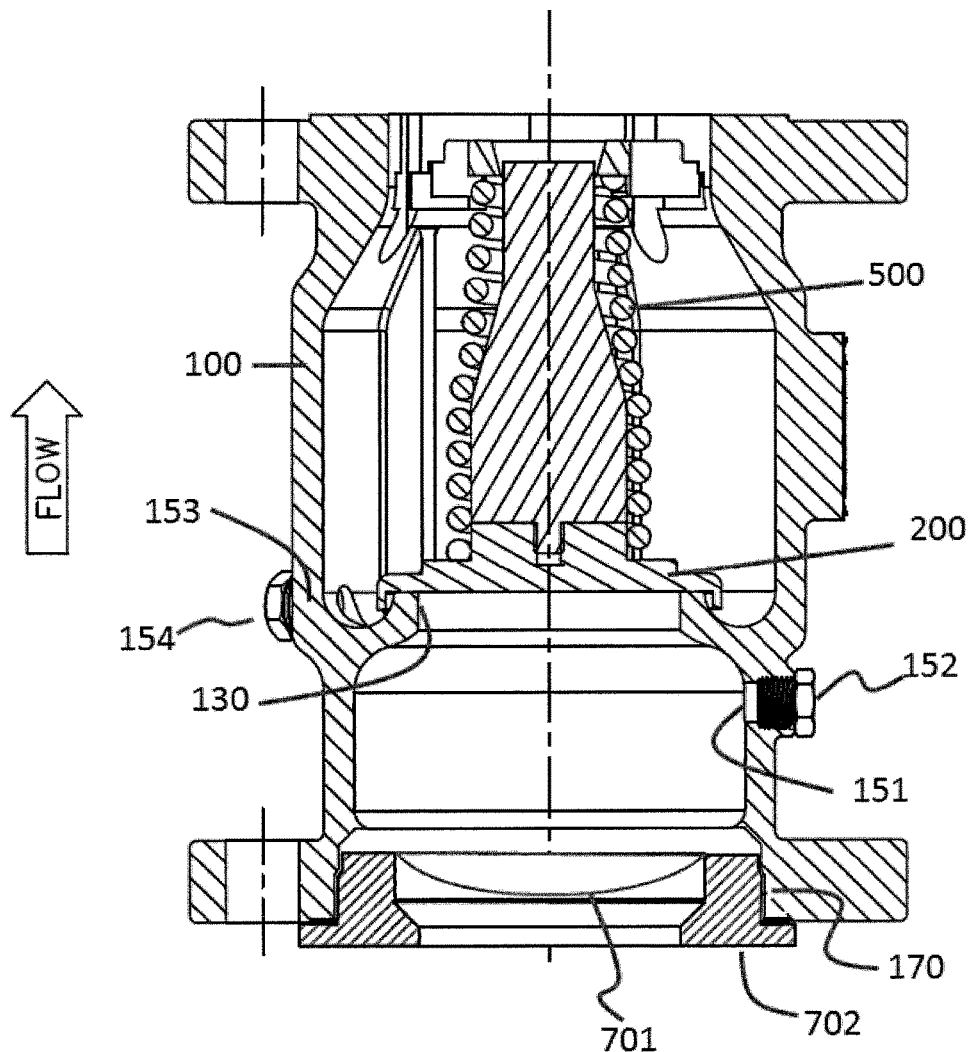
FIG. 11A is a cross-sectional view of the valve assembly of FIG. 1 in combination with a rupture disk and rupture disk holder.
Figure 11B:
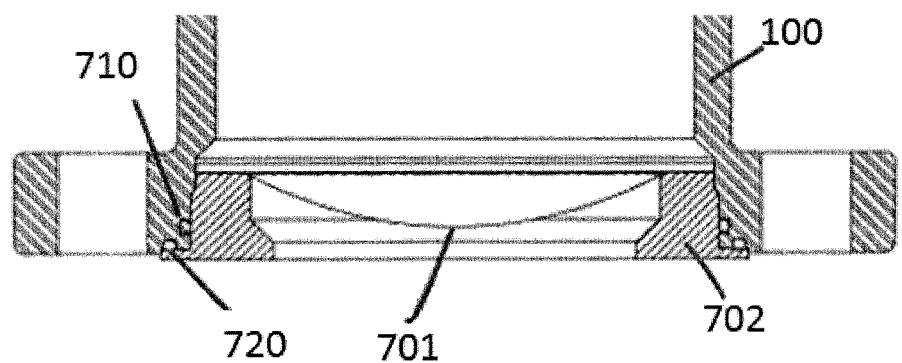
FIG. 11B is a cross-sectional detail view of the rupture disk and rupture disk holder combined with a valve assembly as in FIG. 11A.

Returning to FIG. 1, a valve body 100 may be provided with a rupture disk receiving area 170, into which a rupture disk and rupture disk holder may be inserted. FIG. 11A illustrates the valve assembly of FIG. 1 with a rupture disk 701 and rupture disk holder 702 installed. A rupture disk holder 702 may be sealingly engaged with the valve body 100, to prevent fluid from escaping between the rupture disk holder 702 and the valve body 100. As best illustrated in FIG. 11B, a seal may be provided to ensure sealing engagement between the rupture disk holder 702 and the valve body 100. A seal may be, by way of non-limiting example, one or more O-rings 710, 720.

When used in combination with a rupture disk 701, as illustrated in FIG. 11A, the plug 200 is isolated from inlet pressure and fluid until the rupture disk 701 ruptures in response to an over-pressure condition. Following rupture of the rupture disk 701, the plug 200 will become unsealed from the valve seat 130 in the event that the pressure levels are sufficient to compress the spring 500.

In FIGS. 11A and 11B, a round reverse-acting rupture disk 701 is illustrated, wherein the convex surface of the rupture disk is exposed to system pressures. It is contemplated, however, that any suitable rupture disk may be used. For example, a forward-acting rupture disk may be used, or a rupture disk of non-round or non-uniform cross-section may be used. A rupture disk may have a certified flow resistance factor (Krg) according to ASME Section VIII Division 1 or according to emerging EN and/or ISO flow resistance factor certification requirements. In one embodiment, a Type LPS rupture disk may be used, particularly where the rated flow capacity of the valve and the valve/rupture disk combination must be high. A rupture disk may include features to facilitate reversal and opening at desired pressures and/or to optimize the flow through the disk once opened. In one embodiment, a rupture disk may include a circular score to provide a full opening to maximize flow capacity (i.e., a low Krg in ASME terminology). For example, in a 3-inch nominal size, an LPS rupture disk with a circular score may facilitate a full 3-inch diameter opening. In another embodiment, a rupture disk may be provided with surface features such as an apex indentation to ensure rapid reversal (which facilitates full opening of the disk).

The at least one connection port 151 may be used (with or without a connected device such as an excess flow valve, pressure gage, or pressure sensor) to allow checking, monitoring, sensing and/or regulation of the pressure differential across the rupture disk 701. An excess flow valve may, for example, be configured to allow air pressure to bleed in and out, while forming a fluid-tight seal in the event of an overpressure relief action (e.g., rupture of the rupture disk). In one embodiment, the connection port 151 may be used to ensure that the pressure differential across the rupture disk 701 is always known. For example, the connection port 151 may be used to ensure that downstream pressure is maintained at ambient atmospheric pressure levels. The connection port 151 also may be used (with or without an additional connected device) to monitor, check, or sense whether the rupture disk 701 has activated (i.e., ruptured) or whether the integrity of the rupture disk 701 has been compromised (e.g., via a leak or deformation). In such a manner, the connection port 151 may be used to determine whether the rupture disk 701 requires replacement. In one embodiment, the connection port 151 may be configured to meet an applicable code requirement (e.g., ASME, CEN, or ISO) governing a combined rupture disk and relief valve, including a requirement that the combined device have a mechanism to ensure that the pressure differential across the rupture disk is always known.

A valve body, plug, bumper, holder and other components of a valve assembly may be made from any suitable material, and may be manufactured or fabricated using any suitable method. In one embodiment, a valve assembly component may be made of ASME Section II materials. In one embodiment, a valve body may be a cast component, such as an investment cast or sand cast component.

A pressure relief device according to the present disclosure may provide the advantage of full self-containment of a spring. For example, a known spring (held into place with J-hooks) extends outwardly beyond the plane of the outlet flange of a valve body. In contrast, according to the present disclosure a more compact spring (not visible) may be used, kept entirely within the valve body by a holder according to the present disclosure. The fully contained spring design of the present disclosure avoids the potential of a spring obstructing flow in downstream piping.

A pressure relief device according to the present disclosure may achieve many additional advantages over a prior art pressure relief device.

In one embodiment, the pressure relief device may be used with a higher nominal set pressure (e.g., 50 pounds per square inch ("psi")) as compared to known in-line pressure relief devices (limited, e.g., to 15 psi). In particular, due to its higher pressure ratings, the pressure relief device may be used in applications requiring higher-pressure refrigerants.

A pressure relief device according to the present disclosure is able to attain certifications not previously attained for devices of this type. For example, a pressure relief device according to the present disclosure is capable of attaining ASME Section VIII, Div. 1, UV CE (PED-B) stamped valve status (whereas prior valves at lower nominal set pressures fell below ASME Code thresholds), CE marking under EN 4126-1 (the European pressure relief device standard), and marking under ISO 4126-1 (the international standard based upon EN 4126-1). The valve also may have a certified coefficient of discharge factor (Kd) per ASME Section VIII Division 1. In one embodiment, the valve body may be hydrostatically tested to the requirements of ASME Section VIII Division 1.

A pressure relief device according to the present disclosure provides improved flow capacity. In one embodiment, a valve according to the present disclosure may provide a valve capacity of over 3000 standard cubic feet per minute (SCFM) for a 3-inch nominal size device. Another embodiment of a valve according to the present disclosure may provide a valve capacity of at least 2700 SCFM or at least 2500 SCFM.

Under ASME Code provisions, a combined valve and rupture disk is subject to a 0.9 combination capacity factor (CCF) derating—meaning that a valve's rated flow capacity is derated to 90% of its normal capacity whenever a rupture disk is used in combination. Under those provisions, one embodiment of a combined valve and rupture disk according to the present disclosure may achieve a derated default capacity of at least 2700 SCFM for a 3-inch nominal size application. In another embodiment, a derated default capacity of at least 2430 SCFM or at least 2250 SCFM is achieved for a 3-inch nominal size application. In one embodiment, a minimum of 2550 SCFM is achieved for a 3-inch nominal size application, including the 0.90 ASME rupture disk combination CCF derating.

The actual flow capacity of a combined valve and rupture disk according to the present disclosure may surpass the 0.9 CCF default derating used by ASME Code. Accordingly, in one embodiment, the actual combined flow capacity rating of the combined valve and rupture disk is higher than 0.9. For example, embodiments of the combination according to the present disclosure attain combined capacity factors of as much as at least 0.94 CCF, at least 0.96 CCF, or at least 0.98 CCF.

Although a pressure relief device is depicted above as having bolted inlet and outlet flanges, the disclosure is not limited to that particular configuration. For example, in one embodiment, one or both of the inlet and outlet of the valve body may be clamped to an inlet and/or outlet pipe. In one embodiment, a Tri-Clamp may be used to clamp the body to an inlet and/or outlet pipe. In another embodiment, one or both of the inlet and outlet of the valve body may be threaded, allowing for threaded engagement with an inlet and/or outlet pipe. In another embodiment, the pressure relief device may attach (through bolted flanges, clamping, threading, or other suitable mechanism) only at the inlet, leaving the outlet of the valve open to the environment.

Although the pressure relief device described herein provides particular advantages in high-pressure refrigerant applications, it is contemplated that the principles may be applicable in other applications, including low-pressure applications, as well. For example, a valve or a valve and rupture disk as disclosed above may be used in biotechnology, food and beverage, and transportation applications. The valve or valve and rupture disk as disclosed above also may be miniaturized and/or implemented in a clean service configuration for use in such fields.

It is contemplated that individual features of one embodiment may be added to, or substituted for, individual features of another embodiment. Accordingly, it is within the scope of this disclosure to cover embodiments resulting from substitution and replacement of different features between different embodiments.

The above described embodiments and arrangements are intended only to be exemplary of contemplated systems and methods. Other embodiments will be apparent to those skilled in the art from consideration of the specification and practice of the disclosure herein.

What is claimed is:

1. A pressure relief device, comprising:
   a valve body having a central bore, wherein a valve seat is disposed within the central bore of the valve body;
   a plug;
   a spring configured to press the plug into sealing engagement with the valve seat, wherein the spring is tapered;
   a bumper extending from the plug, wherein the bumper extends along a central axis of the spring, wherein the bumper is tapered, and wherein the tapered shape of the bumper corresponds with the tapered shape of the spring; and
   a holder configured to lock into the valve body, wherein the holder is configured to hold the spring within the valve body.

2. The pressure relief device of claim 1, wherein the plug comprises a plug hood.

3. The pressure relief device of claim 1, wherein the valve body comprises a plurality of internal vanes.

4. The pressure relief device of claim 1, further comprising a mechanical lock, wherein the mechanical lock is configured to prevent the holder from being removed from the valve body.

5. The pressure relief device of claim 1, further comprising:
   a rupture disk, wherein the rupture disk is sealingly engaged with an inlet of the valve body.

6. The pressure relief device of claim 1, wherein the pressure relief device has a 3-inch nominal size, wherein the pressure relief device has a valve capacity greater than 2500 standard cubic feet per minute.

7. The pressure relief device of claim 1, wherein the pressure relief device has a 3-inch nominal size, wherein the pressure relief device has a valve capacity greater than 2700 standard cubic feet per minute.

8. The pressure relief device of claim 1, wherein the pressure relief device has a 3-inch nominal size, wherein the pressure relief device has a valve capacity greater than 3000 standard cubic feet per minute.

9. The pressure relief device of claim 1, wherein the spring is configured to maintain the plug in sealing engagement with the valve seat when the plug is exposed to pressures up to 50 psi.

10. A pressure relief device, comprising:
    a valve body having an internal valve seat;
    a plug configured to sealingly engage with the valve seat;
    a tapered spring configured to maintain the plug in sealing engagement with the valve seat;

a holder configured to retain the spring within the valve body;

a tapered bumper configured to keep the spring in alignment during compression of the spring; and a rupture disk, wherein the rupture disk is sealingly engaged with an inlet of the valve body.

11. The pressure relief device of claim 10, wherein the spring is configured to maintain the plug in sealing engagement with the valve seat when the plug is exposed to pressures greater than 15 psi.

12. The pressure relief device of claim 10, wherein the spring is configured to maintain the plug in sealing engagement with the valve seat when the plug is exposed to pressures up to 50 psi.

* * * * *